Figure 1:
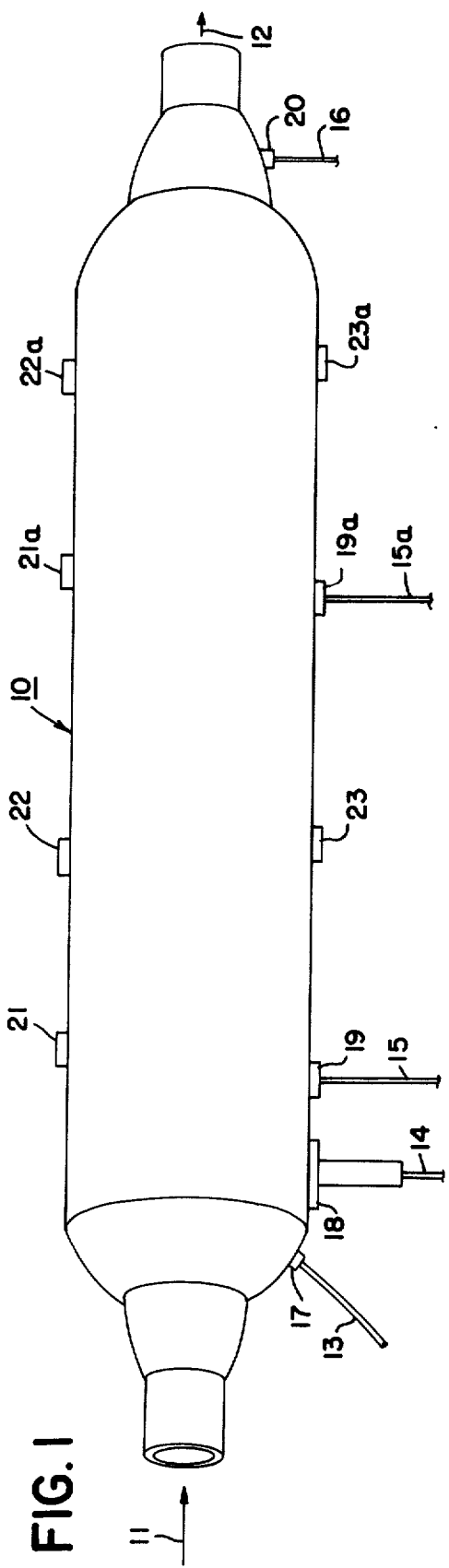

United States Patent [19] [11] 4,077,888
Rhoades et al. [45] Mar. 7, 1978

[54] ARC DISCHARGE APPARATUS

[76] Inventors: John Stewart Rhoades, P.O. Box 197, Exton, Pa. 19341; Gary Kulp, Blackberry La., R.D. 1, Box 185, Malvern, Pa. 19355

[21] Appl. No.: 638,707

[22] Filed: Dec. 8, 1975

[51] Int. Cl.² .............................................. B01K 1/00
[52] U.S. Cl. ............................... 250/543; 204/164; 204/165; 250/542; 250/547
[58] Field of Search ........................ 204/164, 165, 170; 250/531, 542–547

[56] References Cited

U.S. PATENT DOCUMENTS

| 3,526,583 | 9/1970 | Hayward | 204/165 |
| 3,562,127 | 2/1971 | Wooton et al. | 204/164 |
| 3,745,751 | 7/1973 | Zey et al. | 250/532 X |
| 3,755,120 | 8/1973 | Kinser | 204/164 |
| 3,883,413 | 5/1975 | Douglas-Hamilton | 204/176 |
| 3,959,661 | 5/1976 | Sander | 204/164 |

FOREIGN PATENT DOCUMENTS 1,140,424   7/1957   France ................. 250/542

Primary Examiner—F.C. Edmundson
Attorney, Agent, or Firm—Weiser, Stapler & Spivak

[57] ABSTRACT

Undesired emissions from such sources as automobile engines are controlled by providing a confined path to be followed by these, mostly gaseous substances to be controlled. Along this path there is positioned means for establishing an electric field. Preferably, in other portions of the path, there are positioned one or more of the following: means for heating the gas to crack certain constituents into free elements; means for combusting certain constituents; and means for attracting certain constituents through affinity.

19 Claims, 2 Drawing Figures

ARC DISCHARGE APPARATUS

This invention relates to the treatment of substances which exist primarily in gaseous form, but which may also include particulates entrained in the gas.

Such treatment is often desired for the emissions from combustion processes. For example, the internal combustion engines used for automobiles produce emissions of this general type. So do other types of industrial combustion processes, such as power plant boilers, space heaters, raw material treatment furnaces, and so forth. These emissions tend to contain ingredients which are objectionable from the standpoints of human health, adverse effect on animal and plant life, and detrimental effect on inanimate objects, as by corrosion, discoloration, and so forth.

These undesirable effects of such emissions have been too widely recognized to require detailed description here.

Likewise, there have been widely discussed and described a variety of techniques for alleviating these harmful effects, none of which have proven highly satisfactory.

A particularly vexing problem has been presented by automobile emissions. These represent a major contributor of undesirable emissions in many areas, especially in densely populated ones. Moreover, they emit a variety of undesirable substances, including incompletely combusted hydrocarbons, carbon monoxides, and sulfates.

Several factors combine to make the control of these undesirable ingredients of automobile exhaust fumes exceptionally difficult. They are primarily gaseous and the technology for controlling gaseous emissions is not yet well developed. Moreover, they emanate from a myriad of separate sources (the individual automobiles), no one of which can economically bear an expensive control installation.

As a result of this, despite a great deal of work, including the concentrated efforts of the giants of the United States automobile industry, there is still no really satisfactory solution to the automobile emission problem. A recent illustration involves catalytic reactors. These were developed at enormous expense, and their installation and maintenance adds heavily to the initial cost and upkeep expense of each automobile. Yet it now develops that they may actually aggravate the emission of undesirable sulfur compounds from automobiles to the point where the abandonment of catalytic converters is being seriously considered.

Accordingly, it is an object of the invention to provide a different technique for providing some degree of control of the emissions from combustion processes.

While not limited thereto, it is a particular object to so control the emissions from automobiles.

It is still another object to provide an emission control technique which has a certain flexibility, enabling it to be adapted to specific emission control requirements.

It is a further object to provide a technique which relies on a combination of measures to produce optimum results.

These and other objects which will appear are achieved by providing a confined path to be followed by substances (mostly gaseous but possibly also entraining some particulates) to be controlled. Along this path there is positioned means for establishing an electric field. Preferably, there are also positioned in this path one or more of the following: means for heating the gas to crack certain constituents into free elements; means for combusting certain constituents; and means for attracting certain constituents through affinity.

Figure 2:
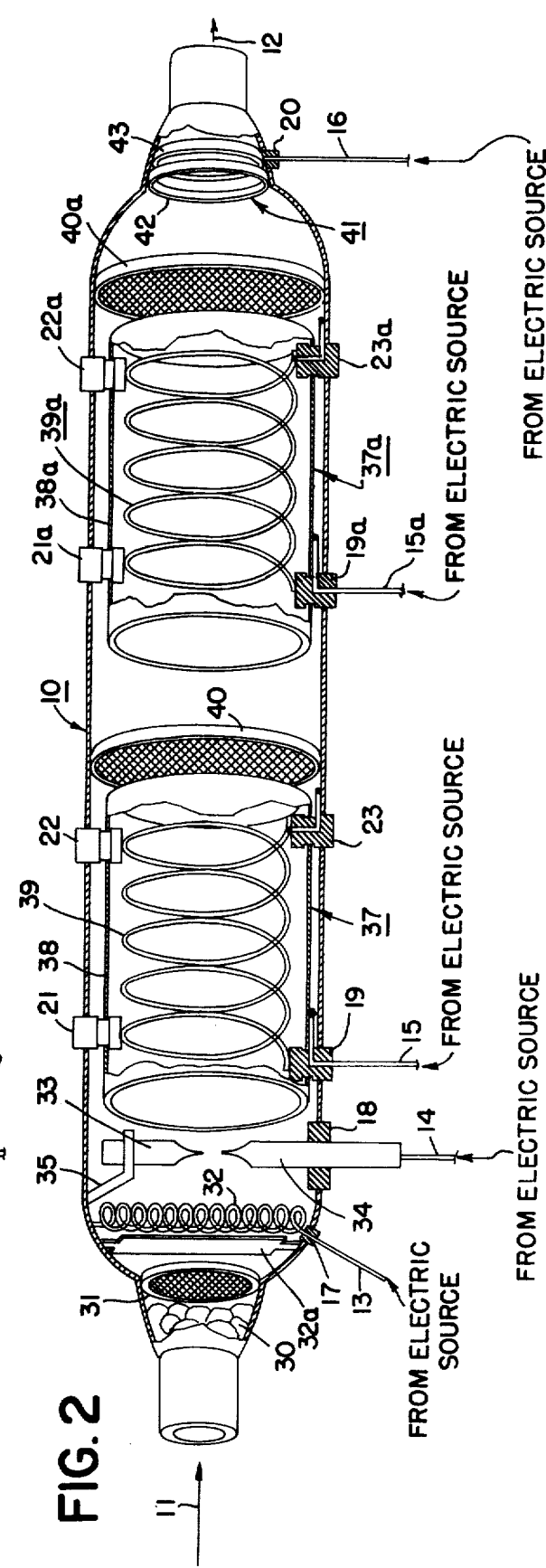

For additional details, reference is made to the description which follows in the light of the accompanying drawings wherein FIG. 1 shows an external, somewhat diagrammatic view of apparatus embodying the invention; and FIG. 2 shows the same embodiment, but with one side of the enclosing wall cut away to show, again somewhat diagrammatically, the internal configuration of said embodiment. The same reference numerals are used in the different figures to denote similar components.

Referring to FIG. 1, this shows a generally cylindrical housing 10 which, in its general outward appearance, may be similar to a conventional automobile muffler. Thus, it includes a central portion of predetermined diameter and end portions of smaller diameter to which the central portion gradually tapers. This unit is intended to be inserted in the exhaust pipe train of an automobile. It would not replace, but supplement the conventional muffler which serves a different purpose, namely, that of reducing the noise of motor operation.

The direction of intended exhaust flow through unit 10 is indicated by arrows 11 and 12. The connection of unit 10 into the conventional exhaust pipe train may be made in any conventional manner, as by suitable clamps or pressure fittings (not shown). Five electrical cable connections 13, 14, 15, 15a and 16 to unit 10 are shown in FIG. 1. Each of these comes from a source of electricity discussed in more detail below. Each leads to an insulating fitting, or coupling on the outside wall of the unit 10. These respective fittings are designated by reference numerals 17, 18, 19, 19a and 20 in FIG. 1. As further explained below, each of these fittings 17 through 20 serves to provide a path into the interior of the unit 10 for its respective electrical connection 13 through 16. These fittings are such as to insulate the connection from the shell of unit 10 so that the electricity supplied by the respective connection is not short-circuited to that shell while being conducted into the interior of unit 10 for purposes discussed below. The fittings must also be capable of withstanding the heat in unit 10.

There are also two sets of three additional insulating fittings provided on unit 10. One set is designated by reference numerals 21, 22 and 23, the other by reference numerals 21a, 22a, and 23a. These do not serve to conduct electricity into its interior. Rather, two of these fittings in each set of three serve only to support certain internal structure insulated from the shell of unit 10. The third fitting in each set of three also serves an insulating support function, but further serves as a ground connection to the outer shell.

Referring now to FIG. 2, this shows, inside the leftmost portion of unit 10, which is the direction from which the automobile exhaust is introduced, a quantity of copper wool 30 retained against penetrating further into the interior of unit 10 by a screen 31. Beyond screen 31 in the direction of the interior of unit 10 there is placed a coil 32 which is preferably made of a suitable electrical resistance heating material, such as nickel-chromium wire. One end of the coil 32 is connected to electrical cable 13 entering the unit 10 through coupling 17. The other end of the coil 32 is connected to the housing itself which serves as the electrical ground.

Between screen 31 and coil 32, upstream from the latter, there is a baffle 32a protecting coil 32 from direct exhaust impingement.

Further towards the interior of unit 10 with respect to coil 32, there is positioned a pair of electrodes 33, 34. These electrodes are preferably positioned diametrically opposite each other in the interior of unit 10. They preferably have sharply pointed or edged terminal portions confronting each other. Electrode 34 is connected to electrical conductor 14 reaching the interior of unit 10 through coupling 18. Electrode 33, on the other hand, is supported by a metal standoff support 35 directly from the outer shell of unit 10 and is thereby grounded electrically to that shell.

Further toward the interior of unit 10 with respect to electrodes 33 and 34 there is a structure 37 comprising an outer cylindrical shell 38 fitted within but spaced from the cylindrical housing 10, and a spiral-form coil 39 spiralling lengthwise within a cylinder 38. Both coil 39 and cylinder 38 are made of copper. One end of coil 39 is grounded to the outer shell of unit 10 through insulating element 23. The other end of conductive coil 39 terminates at insulating element 19, by means of which that other end is kept electrically insulated from the outer shell of unit 10.

Cylindrical shell 38 is maintained at a positive potential with respect to the coil 39 by means of electric potential supplied via cable 15 through coupling 19. Shell 38 is maintained insulated from both coil 39 and from the outer shell of unit 10 by being attached partway up on the internally protruding portions of insulators 19, 21, 22 and 23. Preferably cylinder 38 is externally coated with a refractory material, such as ceramic or enamel to improve its insulation from the outer shell and also prevent deterioration.

Next to unit 37 in the downstream direction of exhaust flow there is preferably positioned a circular screen 40 of comparatively wide-mesh material.

Beyond screen 40, in the downstream direction, there is positioned an assembly 37a, which may be similar to unit 37; except that its two major constituents (coil 39a and shell 38a) are made of molybdenum rather than copper.

Coil 39a is again grounded to the outer shell of unit 10, and cylinder 38a supplied with positive potential via cable 15a and coupling 19a. It will be understood that "ground" in the embodiment of FIGS. 1 and 2 is the ground of the automobile, e.g. the ground connection of the automobile battery, alternator, and other electrical system components.

Downstream from assembly 37a there may be a circular screen 40a of wide-mesh material.

Positioned at the exit end of unit 10 there is an electrostatic precipitator unit 41 which is diagramatically illustrated as comprising two axially displaced rings 42 and 43, between which a suitable high electric potential is maintained by means of conductor 16 connected to ring 43 through insulator 20.

In accordance with the present invention, exhaust fumes from the automobile engine enter unit 10 along the direction indicated by arrow 11. These are normally the unprocessed exhaust fumes, including all of the components which might be found therein, such as oxides of nitrogen, carbon monoxide, incompletely burned hydrocarbons, particles of soot and dirt, sulphur components, and so forth.

This exhaust initially traverses the copper wool 30 filling the entrance to unit 10. This copper wool serves primarily to prevent overheating of the internal elements of unit 10 by the exhaust fumes.

After passing through the copper wool and the retaining screen 31 for the copper wool, the exhaust fumes traverse the portion of unit 10 containing coil 32. This coil is energized from a source of electricity providing adequate voltage and power for raising the temperature of resistance heating coil 32 to the desired value. Such electric power sources are entirely conventional and may take any known form and are therefore not further described herein. The purpose of this coil 32, heated as described above, is to decompose or "crack" certain of the constituents which may be present in the exhaust fumes. In particular, carbon, hydrogen and oxygen present in various composite forms in the exhaust fumes is liberated in free form not bound into compounds with other substances.

Following this decomposition of "cracking ", the fumes continue into the region of unit 10 defined by electrodes 33, 34. These electrodes are energized to provide a sufficiently high potential difference between them so that a substantially continuous electric arc will form between their confronting points. Suitable values are in the range of 18 to 30 kilovolts. The electricity needed for this may be produced by any conventional source suitable for that purpose which is therefore not further described or illustrated. This electricity is supplied through cable 14 to electrode 34. Electrode 35, on the other hand, is grounded to the outer casing of unit 10 through mounting bracket 35.

The arc so formed between electrodes 33 and 34 serves to burn hydrocarbons which remain unburned in the fumes arriving from the automobile engine. It also serves to further oxidize carbon monoxide present in these automobile exhaust fumes to carbon dioxide.

The exhaust then continues from the region defined by electrodes 33 and 34 into the region defined by assembly 37 traversing that assembly and particularly cylinder 38. The cylinder 38 is brought to a suitable electrical potential, which may be the potential of a conventional automobile battery. The necessary potential is supplied from an appropriate source of electricity through cable 15. This is a low voltage source which may take any of a number of conventional forms and is therefore not further described or illustrated. Since the coil 39 within assembly 37 is at ground potential relative to cylinder 38, an electrostatic field extending essentially radially outward within cylinder 38 is established. This field causes dissociation of oxygen and hydrogen from compounds of these elements which may be present in the exhaust fumes passing through cylinder 38.

The exhaust then flows through metal screen 40, which is at ground potential by virtue of being in electrical contact through its annular rim with the inner surface of the shell of unit 10. This screen 40 provides cathodic protection for the electrically active elements which precede it.

The exhaust next passes through assembly 37a, particularly cylinder 38a. Here there takes place further dissociation of oxygen and hydrogen. Because the metal of coil 39a and cylinder 38a is molybdenum, any sulfur compounds from which such oxygen and hydrogen are dissociated, will tend to be intercepted by that molybdenum, due to its affinity for sulphur. Thus $H_2S$ and $SO_2$ compounds will dissociate into hydrogen, oxygen, and sulphur, the sulphur being affected as discussed above.

The cylinder 38a is brought to a suitable electrical potential, as necessary for the intended use, by electricity supplied from an appropriate source through cable 15a. This is also a comparatively low voltage source. It may take any of a number of conventional forms and is therefore not further described or illustrated.

Again screen 40a provides cathodic protection for assembly 37a.

For both protective screens 40 and 40a, the material providing cathodic protection is chosen to be higher on the electromotive scale than the assembly being protected. For assembly 37, of copper, cadmium would be suitable for protector 40. For assembly 37a tungsten would be suitable for protector 40a. The latter may even be omitted, if desired, due to the inherent toughness of the molybdenum.

In order to promote the affinity effect in assembly 37a, the molybdenum in this assembly is preferably maintained in a state in which its surface is somewhat bubbly. This is achieved by maintaining the molybdenum at the appropriate temperature. This is to be distinguished from red heat, which should not be achieved by the molybdenum is assembly 37a. The desired temperature will prevail inherently by the heat of the exhaust, or may be further elevated, if necessary, by using the cylinder 38a to provide resistance heating. In that case, a suitable electric heating coil may be wrapped around the outside of cylinder 38a, between it and the shell of unit 10. The preferred temperature is white heat at approximately 2000° F.

In both assemblies 37 and 37a, the dissociated elements tend to move toward the coil or the cylinder depending on their respective electrical characteristics.

Finally, the exhaust passes through the region defined by the two rings 42 and 43. Ring 42 is preferably conductively connected to the outer shell of unit 10 and therefore at ground potential whereas ring 43 is preferably insulated from that outer shell and is maintained at a suitably elevated potential to achieve electrostatic precipitation of particulates entrained in the exhaust fumes reaching this portion of unit 10. This high potential is provided by electricity from a suitable source thereof via cable 16. Conventional sources of such electric power are well known to those skilled in the art and need therefore not be further described.

After passage through the remainder of unit 10, the remaining constituents of the exhaust are then supplied to the remainder of the automobile exhaust train in the direction indicated by arrow 12 to which unit 10 may be connected in any conventional manner. For example, this unit may then be connected to a conventional muffler and from it to a tailpipe.

The electrical power for the various purposes described above may be derived from the conventional sources of electricity of an automobile, namely its battery or its generator or alternator. In either case, suitable voltage transformations to provide the required levels of voltage for the various connections to unit 10 will be provided in accordance with techniques well known in the art.

The specific voltages and currents (where current flow is involved as in resistance heating) will be adjusted in a manner which can readily be determined by those skilled in the art for any particular case to accomodate the existing design requirements as to volume of exhaust flow, specific unwanted constituents.

While there have been described above particular activities for the several portions of the path along which the exhaust fumes flow through unit 10, applicants do not wish to be limited to this particular functional explanation. Suffice it to say that, in actual practice and on the basis of tests, the overall effect in reducing the content of undesired constituents in automobile exhaust fumes has been observed which is described herein and attributed to the individual functions of the constituent elements of unit 10.

It will also be understood that the applicability of the invention is not limited to automobile exhausts. Rather, the inventive concept is applicable to other sources of undesirable emissions, such as smoke stacks. In such other applications, the dimensions, shape and component elements of a unit such as unit 10 will, of course, be appropriately adapted in accordance with the teachings of the invention. Also, if this is necessary because of the high volume of gas flow, several such units may be provided in parallel, with the total gas flow divided proportionately among them.

Also, the specific sequence of constituent functions within unit 10 need not always be exactly as described above and shown in FIG. 2.

For example, the location of assemblies 37 and 37a may be interchanged so that the exhaust fumes go first through unit 37a and then through assembly 37.

It should be noted, however, that, in all cases, the several functional constituents of an embodiment of the invention such as shown in FIG. 2 interact with each other reinforcingly in effecting the desired overall result. Thus, in FIG. 2, the cracking produced by coil 32 provides additional free elements. The combustion process which takes place by virtue of the arc formed by electrodes 33 and 34, in turn, together with the free elements resulting from the cracking, then provide the suitable gaseous substances for the functions which takes place in assemblies 37 and 37a.

In all cases, the electrostatic precipitator at the exit from unit 10 is optional depending on the extent to which there are troublesome particulates in the exhaust fumes. In fact, if an embodiment of the invention were to be used for controlling the emissions from a smoke stack, then the electrostatic precipitator may be omitted from the unit embodying the invention and instead a conventional external electrostatic precipitator preceding or following the unit may be utilized to remove the particulates from the gas.

It will be understood that various other embodiments and modifications will occur to those skilled in the art without departing from the inventive concept.

We claim:

1. In a system for treating substances which are in the form of a gas within which there may also be entrained particulates, the system comprising a confined path along which said substances move, the improvement comprising:
   means for establishing in a predetermined portion of the path an electric field;
   a metal having an affinity for at least one said substance, said affinity metal being positioned in the same portion of the path as the field establishing means;
   means for establishing an electric arc across another portion of the path; and
   means positioned in still another part of the path for heating the gas passing therethrough to produce cracking of at least some of the substances into free elements,
   the cracking means being positioned first in the path, the arc establishing means being positioned second in the path and the field establishing means being positioned third in the path of the gas, said cracking means, arc means, and field means cooperating to reduce the content of predetermined substances in the gas.

2. The system of claim 1 wherein the field establishing means includes an anode and a cathode.

3. The system of claim 2 wherein the anode and cathode are positioned to produce a field gradient generally transverse to the path.

4. The system of claim 1 comprising a second field establishing means positioned in another part of the path and including a different affinity metal.

5. The system of claim 4 wherein the different affinity metal is molybdenum.

6. The system of claim 5 wherein the molybdenum is heated to a state in which its surface is bubbly.

7. The system of claim 1 wherein the heating means includes an electrically heated coil.

8. The system of claim 1 further comprising means positioned in another part of the path to produce electrostatic precipitation of particulates entrained in the gas.

9. The system of claim 1 further comprising a screen positioned downstream from the field establishing means and of a material higher on the electromotive scale than the affinity metal.

10. The system of claim 1 wherein the field establishing means includes a hollow cylinder and a coil extending longitudinally within the cylinder.

11. The system of claim 10 comprising means for creating a potential difference between the coil and the cylinder.

12. The system of claim 11 wherein the coil and cylinder have confronting surfaces of copper.

13. The system of claim 11 wherein the coil and cylinder have confronting surfaces of molybdenum.

14. The system of claim 10 wherein the surface of the cylinder facing away from the coil is coated with a protective refractory material.

15. The system of claim 1 wherein the field establishing means, the cracking means and the arc producing means are all electrically energized.

16. The system of claim 15 wherein the confined path is formed by a metal shell.

17. The system of claim 16 wherein the shell is provided with electrically insulated connections through its outer wall to the electrically energized means.

18. The system of claim 1 wherein the affinity metal is part of the field establishing means.

19. In a system for treating substances which are in the form of a gas within which there may also be entrained particulates, the system comprising a confined path along which said substances move, the improvement comprising:

means for establishing in a predetermined portion of the path an electric field;

a metal having an affinity for at least one said substance, said affinity metal being positioned in the same portion of the path as the field establishing means;

means for establishing an electric arc across another portion of the path; and means positioned in still another part of the path for heating the gas passing therethrough to produce cracking of at least some of the substances into free elements, the cracking and arc establishing means being positioned in the path upstream of the field establishing means, said cracking means, arc means, and field means cooperating to reduce the content of predetermined substances in the gas.

* * * * *